United States Patent [19]

Inagaki et al.

[11] 4,427,823

[45] Jan. 24, 1984

[54] CURED OR UNCURED FILLED COATING COMPOSITION OF POLYFUNCTIONAL ACRYLIC-TYPE ACID ESTER AND UTILIZATION THEREOF

[75] Inventors: Hajime Inagaki, Ohtake; Hiroshi Wakumoto, Iwakuni, both of Japan

[73] Assignee: Mitsui Petrochemical Industries Ltd., Tokyo, Japan

[21] Appl. No.: 315,292

[22] Filed: Oct. 27, 1981

[30] Foreign Application Priority Data

Oct. 28, 1980 [JP]  Japan .................. 55-150130

[51] Int. Cl.³ .................. C09D 3/80; C08K 3/34; C08K 3/36
[52] U.S. Cl. .................. 524/833; 204/159.15; 204/159.16; 204/159.22; 524/531; 524/851; 524/854
[58] Field of Search .............. 524/833, 854, 851, 531; 204/159.15, 159.16, 159.22

[56] References Cited

U.S. PATENT DOCUMENTS

| | | | |
|---|---|---|---|
| 3,441,535 | 4/1969 | Beacham et al. | 525/29 |
| 3,446,161 | 11/1969 | Marks | 524/424 |
| 3,586,531 | 6/1971 | Aronoff et al. | 204/159.15 |
| 3,721,644 | 3/1973 | Stoffey et al. | 524/854 |
| 3,808,170 | 4/1974 | Rogers | 523/466 |
| 3,835,090 | 9/1974 | Gander et al. | 524/854 |
| 3,968,073 | 7/1976 | Hara et al. | 524/562 |
| 3,991,230 | 11/1976 | Dickie et al. | 204/159.16 |
| 4,028,235 | 6/1977 | King et al. | 524/854 |
| 4,199,421 | 4/1980 | Kamada et al. | 204/159.22 |
| 4,327,014 | 4/1982 | Kawahara et al. | 524/851 |
| 4,340,532 | 7/1982 | Lee et al. | 524/854 |
| 4,344,906 | 8/1982 | Kitagawa et al. | 524/531 |

FOREIGN PATENT DOCUMENTS

| | | |
|---|---|---|
| 2807605 | 9/1978 | Fed. Rep. of Germany . |
| 51-40292 | 4/1976 | Japan . |
| 51-132687 | 11/1976 | Japan . |
| 53-25354 | 7/1978 | Japan . |
| 53-102936 | 9/1978 | Japan . |
| 53-43984 | 11/1978 | Japan . |

*Primary Examiner*—Melvyn I. Marquis
*Assistant Examiner*—H. Lilling
*Attorney, Agent, or Firm*—Sherman & Shalloway

[57] ABSTRACT

In an uncured filled coating composition comprising (a) a polyfuntional acrylic-type carboxylic acid ester monomer or its prepolymer, (b) a polymerization initiator capable of curing said monomer or prepolymer (a), and (c) an inorganic solid filler; the improvement wherein said composition consists essentially of (A) 100 parts by weight of said polyfunctional acrylic-acid carboxylic acid ester monomer or its prepolymer (a), said polyfunctional monomer or prepolymer (a) being composed of 0 to 75% by weight of a trifunctional or higher acrylic-type carboxylic acid ester monomer or its prepolymer having a molecular weight of about 200 to about 700 and 25 to 100% by weight of a difunctional acrylic-type carboxylic acid ester monomer or its prepolymer having a molecular weight of about 160 to about 400, (B) 0.001 to 20 parts by weight of said polymerization initiator (b) capable of curing said monomer or prepolymer (A), and (C) 5 to 250 parts by weight of said inorganic solid filler (c), said filler (c) having a refractive index of 1.40 to 1.60 and an average first-order particle diameter of at least 1 m$\mu$ but less than 1$\mu$; and a cured filled coating composition prepared by curing the said uncured filled coating composition.

11 Claims, No Drawings

CURED OR UNCURED FILLED COATING COMPOSITION OF POLYFUNCTIONAL ACRYLIC-TYPE ACID ESTER AND UTILIZATION THEREOF

This invention relates to an uncured filled coating composition of a polyfunctional acrylic-type carboxylic acid ester monomer or its prepolymer, a cured composition obtained by curing this composition, and a process for producing transparent articles by using the uncured composition.

Specifically, this invention relates to a cured filled coating composition having outstanding transparency, outstanding characteristic properties such as weatherability, adhesion to substrates and thermal durability, and other excellent properties such as hardness, scratch resistance, abrasion resistance, chemical resistance and surface gloss; an uncured filled coating composition for use in forming said cured composition; and to a process for producing transparent articles using the uncured composition.

More specifically, this invention relates to an uncured filled coating composition comprising (a) a polyfunctional acrylic-type carboxylic acid ester monomer or its prepolymer, (b) a polymerization initiator capable of curing said monomer or prepolymer (a), and (c) an inorganic solid filler; characterized in that said composition consists essentially of (A) 100 parts by weight of said polyfunctional acrylic-type carboxylic acid ester monomer or its prepolymer (a), said polyfunctional monomer or prepolymer (a) being composed of 0 to 75% by weight of a trifunctional or higher acrylic-type carboxylic acid ester monomer or its prepolymer having a molecular weight of about 200 to about 700 and 25 to 100% by weight of a difunctional acrylic-type carboxylic acid ester monomer or its prepolymer having a molecular weight of about 160 to about 400, (B) 0.001 to 20 parts by weight of said polymerization initiator (b) capable of curing said monomer or prepolymer (A), and (C) 5 to 250 parts by weight of said inorganic solid filler (c), said filler (c) having a refractive index of 1.40 to 1.60 and an average first-order particle diameter of at least 1 m$\mu$ but less than 1$\mu$.

It also relates to a cured composition obtained by curing said uncured composition, and to a process for producing transparent articles by using the uncured composition.

Methods have previously been proposed for coating the surfaces of plastics, metals, ceramics, and other materials with coating compositions, varnishes or the like containing various polymers in order to provide a protective coating, prevent breakage, or to impart surface hardness, insulating properties or other desired properties.

One type of the coating compositions used for such purposes comprises (a) a polyfunctional acrylic-type carboxylic acid ester monomer or its prepolymer and (b) a polymerization initiator capable of curing the monomer or prepolymer (a), and is disclosed, for example, in Japanese Patent Publication Nos. 43553/1978, 43984/1978 and 25354/1978 and Japanese Laid-Open Patent Publication Nos. 102936/1978 and 104638/1978 (corresponding to U.S. Pat. No. 4,199,421). These prior art references do not at all refer to the use of an inorganic solid filler. Since this type of composition is characterized by forming a cured coating layer having good transparency, it is natural that these patent documents do not describe the incorporation of a filler which, it is anticipated, would reduce transparency rather than increase it. Moreover, a coated film prepared from this type of composition does not have fully satisfactory surface hardness and scratch resistance. Because the coated film undergoes high shrinkage upon polymerization, strain will be generated in the substrate and the impact strength of the coated film will be reduced. These drawbacks set a limitation on the utilization of this type of coating compositions.

Another known composition of this type is a filled composition containing an inorganic solid filler which is useful as a dental material such as a crown-forming material or a dental filler material (disclosed, for example, in Japanese Laid-Open Patent Publication No. 41292/1976 and Japanese Patent Publication No. 36791/1979).

Japanese Laid-Open Patent Publication No. 41292/1976 proposes a paste-like monomer composition for dental crowning hard resins, which is prepared by uniformly mixing 40 to 80 parts by weight of a crystalline methacrylic acid derivative having a melting point of 40° to 80° C. such as bisphenol-A dimethacrylate or bis(methacryloxyethoxyphenyl)propane with 60 to 20 parts by weight of a methacrylic acid derivative having a melting point of not more than 25° C. and as required a polymerization inhibitor, a polymer powder, finely divided silica, etc. This patent document refers to the hardness, compression strength, abrasion resistance and water absorption of a cured composition obtained by curing the paste-like monomer composition, but is quite silent on its transparency. This will be natural since a white to ivory material is usually desired as a dental material. Furthermore, this patent document does not describe the refractive index or particle size of the inorganic solid filler, nor does it refer to the weatherability, adhesion to substrates, and thermal durability of the cured composition.

Japanese Patent Publication No. 36791/1979 proposes a dental resin composition comprising an acrylate and/or a methacrylate or a dental resin composition composed of an acrylate and/or methacrylate as a polymerizable binder and an inorganic filler such as silica rock powder, quartz powder or aluminum oxide, which is characterized by containing L-ascorbic acid as well as an organic peroxide and a tertiary amine. The invention of this patent publication has for its object the provision of a composition which has a curing speed slow enough at room temperature to ensure its operability in dental therapy but cures rapidly within the oral cavity. The patent document refers to the compression strength of the cured composition, but is quite silent on its transparency. The Japanese Patent Publication exemplifies aluminum oxide, silica rock powder, quarts powder, glass beads, glass fibers and silicic anhydride as the inorganic filler, and describes that the particle size of these inorganic filler materials is 1 to 80 microns. It does not describe the refractive index of the inorganic solid fillers, nor fillers having a particle size of less than 1 micron. In addition, no attention is paid in this Patent Publication to the weatherability, adhesion to substrates and thermal durability of the cured composition.

The present inventors have made investigations in order to provide a filled coating composition of a polyfunctional acrylic-type carboxylic acid ester which shows outstanding transparency, outstanding characteristic properties such as weatherability, adhesion to substrates and thermal durability, and other excellent properties such as hardness, scratch resistance, abrasion resistance, chemical resistance and surface gloss.

These investigations have led to the discovery that a composition which meets a combination of parameters, i.e. the inclusion of a specified amount of an ultrafine inorganic solid filer (C) having a refractive index of 1.40 to 1.60 and an average first-order particle diameter of at least 1 m$\mu$ but less than 1 micron, preferably a refractive index of 1.42 to 1.58 and an average first-order particle diameter of 1 m$\mu$ to 500 m$\mu$, together with specified amounts of a polyfunctional acrylic-type carboxylic acid ester monomer or its prepolymer (A) and a polymerization initiator (B), possesses the aforesaid excellent properties.

It has also been found that the composition of this invention meeting the combination parameters (A), (B) and (C) exhibits excellent transparency as well as excellent weatherability, adhesion and thermal durability under severe conditions described hereinbelow just prior to the description of examples, and has excellent properties not obtainable by conventional unfilled or filled compositions of polyfunctional acrylic-type carboxylic acid esters.

It is an object of this invention therefore to provide an improved cured or uncured filled coating composition of a polyfunctional acrylic-type carboxylic acid ester.

Another object of this invention is to provide a process for producing excellent transparent articles by using the aforesaid uncured filled coating composition.

The above and other objects of this invention along with its advantages will become more apparent from the following description.

The polyfunctional acrylic-type carboxylic acid ester monomer or its prepolymer (A) used in this invention is composed of 0 to 75% by weight, preferably 0 to 50% by weight, of a trifunctional or higher acrylic-type carboxylic acid ester monomer or its prepolymer having a molecular weight of about 200 to about 700, preferably a prepolymer consisting of 2 to 250 molecules of said monomer, and 25 to 100% by weight, preferably 50 to 100% by weight, of a difunctional acrylic-type carboxylic acid ester monomer or its prepolymer having a molecular weight of about 160 to about 400, preferably a prepolymer consisting of 2 to 250 molecules of said monomer.

The polyfunctional acrylic-type carboxylic acid ester monomer denotes a compound which has two or more acrylic-type carboxylate units in the molecule and therefore have two or more acrylic unsaturated carbon-carbon bonds per molecule. It may also contain another unsaturated carbon-carbon bond. The prepolymer of the polyfunctional acrylic-type carboxylic acid ester monomer denotes a product obtained by polymerizing the aforesaid polyfunctional acrylic-type carboxylic acid ester by heat-polymerization, radical-polymerization, photopolymerization, radiation-induced polymerization, etc. to an extent that the product consists of 2 to about 250 molecules of said monomer. It also includes a mixture of prepolymers of different degrees of polymerization.

Such polyfunctional acrylic-type carboxylic acid ester monomers or prepolymers thereof are known, and those which meet the requirements mentioned in (A) can be selected.

Examples of acrylic-type carboxylic acid components which constitute these polyfunctional acrylic-type carboxylic acid ester monomers or prepolymers include acrylic acid, methacrylic acid, 2-ethylacrylic acid, 2-propylacrylic acid, 2-isopropylacrylic acid, 2-butylacrylic acid, 2-pentylacrylic acid, 2-hexylacrylic acid, atropic acid ($\alpha$-phenylacrylic acid, 3-methylacrylic acid, 3-ethylacrylic acid, 3-propylacrylic acid and 3-isopropylacrylic acid. Of the aforesaid polyfunctional acrylic-type carboxylic acid ester monomers of prepolymers, polyfunctional acrylic esters, polyfunctional methacrylates, and the prepolymers of these are preferred.

Preferred examples of the polyfunctional acrylic-type carboxylic acid ester monomer or its prepolymer are esters formed between acrylic or methacrylic acid and each of ester-forming components (1) to (7) below and having a molecular weight within the above-specified range.

(1) Alkylene glycols of the formula HO-R-OH in which R represents an alkylene group having 1 to 15 carbon atoms.

Examples of esters between such alkylene glycols and acrylic or methacrylic acid are those of the following formula

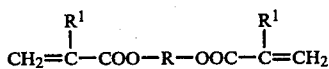

wherein $R^1$ represents a hydrogen atom or a methyl group and R is as defined above.

(2) Polyalkylene glycols of the formula HO-$(R^2O)_n$-$R^3$OH in which $R^2$ and $R^3$ each represent an alkylene group having 2 to 6 carbon atoms, and n is a number of at least 0.5, for example an integer of 1 to 4.

Examples of esters between such polyalkylene glycols and acrylic or methacrylic acid are those of the following formula

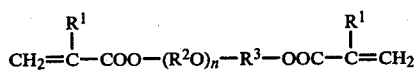

wherein $R^1$, $R^2$, $R^3$ and n are as defined above.

(3) Methylolalkanes of the formula $(HOCH_2)_{4-m}CR^4_m$ in which $R^4$ represents an alkyl group having 1 to 15 carbon atoms or $CH_2OH$, and m is 0 or 1.

Examples of esters formed between such methylolalkanes and acrylic or methacrylic acid are those of the following formula

wherein $R^1$, $R^4$, and m are as defined above.

(4) Glycerol (HO-$CH_2$-CH(OH)-$CH_2OH$)

Examples of esters formed between glycerol and acrylic or methacrylic acid include the diesters and triesters.

(5) Polyglycidols of the formula

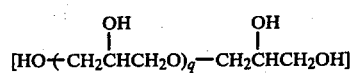

wherein q is 0 or an integer of 1 or more, for example 1 to 3.

Examples of esters formed between the polyglycidols and acrylic or methacrylic acid are those of the following formula

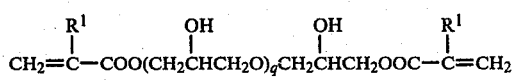

wherein $R^1$ and q are as defined above.

(6) Oxyalkylene glycidyl diols of the following formula

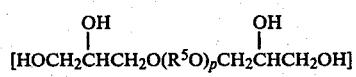

wherein $R^5$ represents an alkylene group having 2 to 5 carbon atoms, and p is 1 or 2.

Examples of esters formed between such oxyalkylene glycidyl diols and acrylic or methacrylic acid are those of the following formula

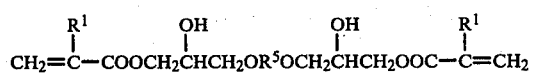

wherein $R^1$ and $R^5$ are as defined above.

(7) Diols having the following formula $$HO-(CH_2)_2-\phi-(CH_2)_s OH$$

in which $\phi$ is

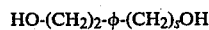

s is 0 or an integer of 1 or 2.

Examples of esters formed between such and acrylic or methacrylic acid are those of the following formula

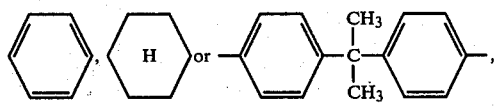

in which $R^1$, $\phi$ and s are as defined above.

Of the above examples, the compounds (1) to (6) are especially preferred.

Specific examples of the polyfunctional acrylic-type carboxylic acid ester monomer used in this invention are given below (in which $R^1$ is H or $CH_3$).

(1a) $CH_2=CR^1-COO-CH_2CH_2-OOC-R^1C=CH_2$
(1b) $CH_2=CR^1-COO-CH(CH_3)CH_2CH_2-OOC-R^1C=CH_2$
(1c) $CH_2=CR^1-COO-(CH_2)_4-OOC-R^1C=CH_2$
(1d) $CH_2=CR^1-COO-CH_2C(CH_3)_2CH_2-OOC-R^1C=CH_2$
(1e) $CH_2=CR^1-COO-(CH_2)_6-OOC-R^1C=CH_2$
(2a) $CH_2=CR^1-COO-(CH_2CH_2O)_2-OC-R^1C=CH_2$
(2b) $CH_2=CR^1-COO-(CH_2CH_2O)_3-OC-R^1C=CH_2$
(2c) $CH_2=CR^1-COO-(CH_2CH_2O)_4-OC-R^1C=CH_2$
(2d) $CH_2=CR^1-COO-(CH(CH_3)CH_2O)_2-OC-R^1C=CH_2$
(3a) $(CH_2=CR^1-COOCH_2)_4C$
(3b) $(CH_2=CR^1-COOCH_2)_3C-CH_3$
(3c) $(CH_2=CR^1-COOCH_2)_3C-CH_2CH_3$
(3d) $(CH_2=CR^1-COOCH_2)_3C-CH_2OH$
(4a) $CH_2=CR^1-COOCH_2-CH(OH)-CH_2OOC-R^1C=CH_2$
(4b) $HOCH_2-CH(OOC-R^1C=CH_2)-CH_2(OOC-R^1C=CH_2)$
(4c) $(CH_2=CR^1-COO)CH_2-CH(OOC-R^1C=CH_2)-CH_2(OOC-R^1C=CH_2)$
(6a) $CH_2=CR_1-COO-CH_2CH(OH)CH_2O-C_2H_4O-CH_2CH(OH)CH_2-OOC-R^1C=CH_2$
(6b) $CH_2=CR_1-COO-CH_2CH(OH)CH_2O-(C_2H_4O)_2-CH_2CH(OH)CH_2-OOC-R^1C=CH_2$
(5a) $CH_2=CR^1-COO-[CH_2CH(OH)CH_2O]_3-OC-R^1C=CH_2$

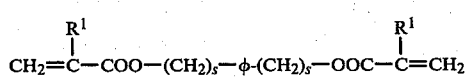

The above-exemplified polyfunctional acrylic-type carboxylic acid ester monomer or prepolymers may be used as mixtures.

The coating composition of this invention contains 0.001 to 20 parts by weight, preferably 0.005 to 10 parts by weight, more preferably 2 to 5 parts by weight, of the polymerization initiator (B) capable of curing the component (A) per 100 parts by weight of the component (A).

Examples of the polymerization initiators (B) include radical initiators such as organic peroxides, inorganic peroxides, nitrile compounds, azo compounds, diazo compounds and sulfinic acid compounds, photosensitizers such as benzoin compounds and acetophenone compounds, and ionic initiators such as hydroacids, Lewis acids and alkali metals.

The organic peroxides include, for example, methyl ethyl ketone peroxide, cumene hydroperoxide, di-tert-butyl peroxide, 2,5-dimethyl-di-di(tert-butylperoxy)-hexyne-3, lauroyl peroxide, benzoyl peroxide, di-isopropyloxy dicarbonate, tert-butylperoxypivalate, and mixtures of these.

The inorganic peroxides include, for example, hydrogen peroxide, ammonium persulfate and potassium persulfate.

The nitrile compounds include, for example, 2,2'-azobisvaleronitrile and 2,2'-azobisisobutyronitrile.

The azo or diazo compounds include, for example, diazoaminobenzene, and p-nitrobenzene diazonium salt.

The sulfinic acid compounds include, for example, p-toluenesulfinic acid, sodium p-toluenesulfinate, and propylsulfinic acid.

These radical initiators can be used either singly or as a mixture in arbitrary ratios. In order to promote the polymerization initiating reaction or to perform it at low temperatures, an amine such as N,N-dimethyl-p-toluidine, N,N-dimethanol p-toluidine, N,N-diethanol-p-toluidine, or N,N-dimethylaniline, a sulfinic acid or its salt such as benzenesulfinic acid or p-toluenesulfinic acid, an inorganic compound such as sodium bisulfite, sodium sulfite or ferrous sulfate, a complex of a metal such as Ni, Co, Fe, or Mn, or sodium alginate may be used in combination with the organic peroxides.

Examples of the photosensitizer used as the polymerization initiator include mercury, inorganic salts such as ferric chloride and lead dichloride, carbonyl compounds such as benzophenone, benzil, cyclohexanone, benzoin ethyl ether, benzoin methyl ether, benzoin isopropyl ether, benzoin n-butyl ether, and biacetyl, peroxides such as hydrogen peroxide, tert-butyl peroxide and benzoyl peroxide, azobis compounds such as azobiscyclohexane carbonitrile, azobispropane and azobisisobutyronitrile, sulfur compounds such as thiophenol, thiocresol, 2-mercaptobenzimidazole, 2-mercaptobenzoxazole, methyl dithiocarbamate, diphenyl sulfide and tetraalkylthiuram sulfides, and halogen compounds such as 2-bromopropane and 1-chlorocyclohexane.

Dyes such as Rhomadmine, Erythrocin, Acriflavin, Fluoresceine, and cryptocyanine may also be used as sensitizers for visible light. Of these photosensitizers, carbonyl compounds such as benzoin ethyl ether and benzoin methyl ether, and peroxides such as benzoyl peroxide and tert-butyl peroxide are preferred.

Examples of the ionic initiators include cationic initiators, for example hydroacid compounds such as sulfuric acid, phosphoric acid, chlorosulfonic acid and hydrochloric acid, Lewis acids such as zinc chloride, boron trifluoride, various complexes of boron trifluoride, aluminum trichloride, titanium tetrachloride, stannous chloride, stannic chloride and iron trichloride, and cation-yielding substances such as iodine and silver perchlorate; and anionic initiators, for example alkali metals such as sodium, potassium and lithium, Grignard reagents such as magnesium methyl bromide, alkaline compounds such as n-butyllithium, sodium naphthalene, n-butyl bromide and benzyl chloride, and hydroxides such as potassium hydroxide and sodium hydroxide.

The composition of this invention further comprises 5 to 250 parts by weight, preferably 5 to 150 parts by weight, more preferably 5 to 60 parts by weight, of the inorganic solid filler (C) having a refractive index of 1.40 to 1.60, preferably 1.42 to 1.58, and an average first-order particle diameter of at least 1 m$\mu$ but less than 1 micron, preferably 1 m$\mu$ to 500 m$\mu$, per 100 parts by weight of the component (A).

Examples of the inorganic solid filler include the following inorganic solid fillers which meet the aforesaid average first-order particle diameter requirement and have the refractive indices n shown in the parentheses.

Glass powder (n=1.45–1.58),
beads or flakes of A glass (n=1.52),
beads or flakes of E glass (n=1.54),
diatomaceous earth (n=1.46),
anhydrous silica (n=1.54) prepared by the dry method or the gaseous phase metod,
hydrated silica (amorphous silica containing while carbon; (n=1.55) prepared by the wet method, or by reacting sodium silicate with a by-product formed during production of lime perphosphate, or by decomposing acid clay with sulfuric acid, natural silicate (n=1.54–1.55) called siliceous sand, silica rock, or quartz,
natural silicate salts (n=1.49–1.57) called kaolinite, dickite, nacrite, or halloysite,
pyrophyllite (n=1.55–1.58),
montmorillonite (n=1.48–1.55),
sericite (n=1.56–1.58),
talc (n=1.53–1.58), and
chlorite, pottery stone, or feldspar (n=1.51–1.59).

Among these inorganic fillers, those having an $SiO_2$ content of at least 85%, such as glass powder, diatomaceous earth, anhydrous silica, hydrated silica and natural silicate, are preferred.

Especially preferred species are those in which at least 5 mole% of the silanol group (Si-OH) on the surface of silica is either (a) esterified with a $C_1$-$C_6$ alcohol,
(b) alkylated with $Cl_2Si(CH_3)_2$ or $Cl_3Si(CH_3)$, or
(c) modified with a silane coupler of the formula $(CH_3O)_3SiR$ in which R is a $C_1$-$C_5$ alkyl group or its derivative, or a titanium coupler, or those in which silica is coated with a surface active agent such as sodium dodecylbenzene sulfonate, trimethyl ammonium chloride, dimethyl benzyl ammonium chloride or a polyoxyethylene alkylate. In use, these $SiO_2$-type fillers are conveniently dispersed in a polar solvent such as water, alcohols or ketones.

Examples of such forms of fillers are hydrophobic silica obtained by synthesizing silica by the gaseous phase method and alkylating it with $Cl_2Si(CH_3)_2$, methanol silica sol prepared by dispersing silica (synthesized by the wet method) in methanol, and a product obtained by esterifying the surface of silica (synthesized by the wet method) with an alcohol. A dispersion of such a form of inorganic filler in an alcohol is also preferably used because it has an average first-order particle diameter of about 50 m$\mu$.

The inorganic solid filler (C) used in this invention must meet a combination of parameters, i.e. the refractive index and the first-order particle diameter specified hereinabove. If one or both of these parameters are not fulfilled, the improvement contemplated by this invention is difficult to achieve.

For example, if the refractive index of the inorganic solid filler is outside the above-specified range, the difference of it from the refractive index of the film-forming polyfunctional acrylic polymer is so large that the transparency of the coated film is reduced.

Inorganic solid fillers having an average first-order particle diameter below the lower limit specified hereinabove are difficult to obtain. If the average first-order particle diameter exceeds the upper limit specified hereinabove, the resulting coated film scatters light and its transparency is reduced. Furthermore, in tests for heat resistance, boiling water resistance, hot water resistance and weatherability, strain occurs in the neighborhood of the particles of the inorganic filler upon the shrinking or expansion of the acrylic polymer, and consequently, cracks or creases tend to form in the coated film.

As stated hereinabove, the composition of this invention contains 0.001 to 20 parts by weight of the component (B) and 2 to 250 parts by weight of the component (C) per 100 parts by weight of the component (A).

If the proportion of the component (B) is too small beyond the above-specified range, the acrylic monomer or prepolymer does not attain a sufficient degree of polymerization, and the coated film lacks hardness or abrasion resistance. If, on the other hand, it is too large beyond the above-specified range, the rate of polymerization is so high that strain occurs in the coated film, and the coated film becomes brittle. Moreover, discoloration occurs in a weatherability test, and the hardness of the coated film might be reduced.

If the proportion of the component (C) is too small beyond the above-specified range, the coated film has insufficient hardness or abrasion resistance. Furthermore, shrinkage of the film occurs upon polymerization and strain remains therein to reduce its impact strength. If, on the other hand, it is too large beyond the above-specified range, the surface of the coated film becomes uneven, and its transparency is impaired. Moreover, its adhesion to a substrate is reduced.

If the amount of the difunctional acrylic-type carboxylic acid ester monomer or its prepolymer in the component (A) is less than 25% by weight, the coated film tends to be colored. Furthermore, in heat resistance and weatherability tests, cracks tends to occur in the coated film because of its low flexibility. The flexural resistance of the coated film is also poor.

If the molecular weight of the difunctional acrylic-type carboxylic acid ester monomer is too low beyond the specified range of about 160 to about 400, the cross-linked network structure after curing has a small mesh opening size, and therefore the cured product has poor flexibility and low flex resistance. Moreover, cracks tend to form. If, on the other hand, the molecular weight of the difunctional monomer is too large beyond the specified range, the cross-linked network structure after curing has so large a mesh opening size that sufficient hardness or abrasion resistance cannot be obtained.

If the molecular weight of the trifunctional or higher acrylic-type carboxylic acid ester monomer is too low beyond the specified range of about 200 to about 700, the crosslinked network structure after curing has a small mesh opening size, and has poor flexibility. If, on the other hand, it is too high beyond the specified range, the crosslinked network structure after curing has so large a mesh opening size, that it has poor hardness or abrasion resistance.

The composition of this invention consists essentially of the aforesaid components (A), (B) and (C), and may further contain additives in amounts which do not adversely affect the aforesaid outstanding transparency, outstanding characteristic properties such as weatherability, adhesion to substrates and thermal durability, and other excellent properties.

Such additives may include, for example, about 0.1 to about 10, preferably about 0.5 to about 5% by weight, based on the weight of the component (A), of antistatic agents such as N,N-bis(2-hydroxyethyl)alkylamines, dioxyethylene laurylamine, glycerol monostearate and stearyl diethanolamine monostearate; about 0.1 to about 10, preferably about 0.5 to about 5, % by weight, based on the weight of the component (A), of slip agents such as erucamide and stearamide; about 0.01 to about 10, preferably about 0.1 to about 5% by weight, based on the weight of the component (A), of ultraviolet absorbers such as 2(2-hydroxy-3-tert. butyl-5-methylphenyl)-5-chlorobenzotriazole and bis(2,2′,6,6′-tetramethyl-4-piperidine)sebacate; about 0.01 to about 10, preferably about 0.1 to about 5, % by weight, based on the weight of the component (A), of antioxidants such as 3,5-di-tert.butyl-4-hydroxytoluene, tris(mixed mono- and di-nonylphenyl)phosphite and tetrakis-[methylene(3,5-di-tert.butyl-4-hydroxy)hydroxycinnamate]methane.

In order to impart antistatic property, anticlouding property or other functions, a monofunctional monomer capable of being copolymerized with the monomer or prepolymer (A) may be incorporated into the composition of this invention. The proportion of the monofunctional monomer may be any which does not impair the properties of a coated film obtained from the coating composition of this invention. Generally, it is up to 20 parts by weight, preferably up to 5 parts by weight, per 100 parts by weight of the polyfunctional acrylic-type carboxylic acid ester monomer or its prepolymer (A).

Specific examples of the monofunctional monomer include quaternary ammonium salts of acrylic or methacrylic acid esters, sulfonic acid salt of styrene, alkyl acrylates or methacrylates, polyethylene glycol monoacrylates or methacrylates, dimethylaminoethyl acrylates or methacrylates, diethylaminoethyl acrylates or methacrylates, glycidyl acrylates or methacrylates, 2-hydroxyethyl acrylates or methacrylates, tetrahydrofurfuryl acrylates or methacrylates, vinyltrimethoxysilane, vinyltriethoxysilane, vinyltrichlorosilane, vinyltris(β-methoxyethoxy)silane, γ-glycidoxypropyltrimethoxysilane, maleic anhydride, 4-(meth)acryloylethyltrimellitic anhydride of the following formula

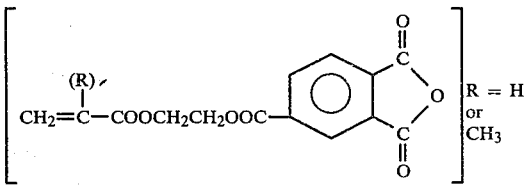

4-(meth)acryloylethyltrimellitic acid of the following formula

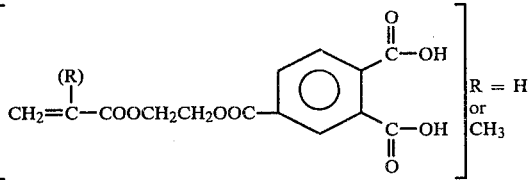

diphenyl-2(meth)acryloyloxyethyl phosphate of the following formula

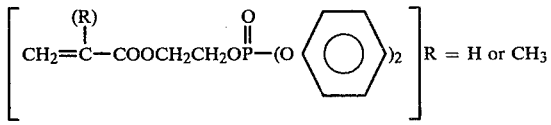

and acrylic or methacrylic acid.

A known polymerization inhibitor may also be added to the coating composition of this invention in order to adjust the rate of polymerization or to increase the storage stability of the composition. The proportion of the polymerization inhibitor may be any which does not impair the properties of a coated film prepared from the composition. Generally, it is up to 1 part by weight, preferably up to 0.01 part by weight, per 100 part by weight of the monomer or prepolymer (A).

A solvent may also be added to the composition of this invention in order to adjust the viscosity of the composition during preparation or in a coating operation. The solvent may be any which can dissolve or uniformly disperse the components (A) and (B). For example, it is used in an amount of up to 500 parts by weight, preferably up to 400 parts by weight, per 100 parts by weight of the component (A).

Various methods can be employed to prepare the coating composition of this invention. For example, there can be used (1) a method which comprises kneading the components (A), (B) and (C) and as required, other additives, the monofunctional monomer and the solvent; (2) a method which comprises kneading the components (A) and (C) and as required the other additives, the monofunctional monomer and the solvent, and kneading the mixture further with the component (B); or (3) a modification of the method (1) or (2), in which the additives, the functional monomer and the solvent as optional components are partly or wholly added during or after the kneading of the aforesaid components, and the kneading is continued. The kneading operation for the preparation of the composition of this invention may be performed by any known conventional methods. Specifically, the kneading may be carried out by means of, for example, a roll, a Banbury mixer, a ball mill, an attriter, a whipper, an oaks mixer, a dissolver, a homogenizer, a colloid mill, a sand mill, a vibratory mill, a mixer, a stirring mixing tank, etc. By the aforesaid kneading operation, the composition of the invention is obtained as a uniformly dispersed liquid or paste.

The composition of this invention can be coated on a substrate to form a coated film by conventional known methods. For example, this can be achieved by washing the surface of a substrate with a suitable solvent, optionally drying it, pre-treating the cleaned substrate by a known method, coating the composition of this invention on the surface of the substrate, optionally drying it, and then curing it. The drying and curing steps after the coating may be carried out simultaneously.

The individual steps of coating will be briefly described below by way of illustration only.

The cleaning of the surface of the substrate may be carried out by known methods, for example, by washing it with various solvents, an aqueous alkaline solution or a surface-active agents, or by sonication, electrolysis or blasting. The pre-treatment of the surface of the substrate may be carried out, for example, by sand blasting, an etching treatment with an acid or alkali, flaming treatment, corona discharge treatment, arc discharge treatment, glow discharge treatment, plasma discharge treatment, primer treatment, a chemical treatment, etc.

In the primer treatment, primers generally used as adhesives may be used. Examples include epoxy resins, cyanoacrylates, polyamide-epoxy resins, nitrile rubbers, chloroprene rubber, chlorinated polyolefins, phenol/-formaldehyde resin, and polyurethan. There can also be used a copolymer of ethylene with a monolefin such as propylene, 1-butene, 4-methyl-1-pentene, acrylic or methacrylic acid, methyl acrylate or methacrylate, vinyl chloride, or styrene, or a polymer obtained by modifying such an ethylene copolymer with maleic anhydride, trivinylmethoxysilane vinyl tris(β-methoxyethoxy)silane, γ-glycidoxypropyl trimethoxy silane, or 4-(meth)acryloylethyltrimellitic anhydride, as a solution in toluene or trichloroethane.

The uncured filled coating composition of this invention consisting essentially of the components (A), (B) and (C) may be coated on the surface of a substrate by various methods, for example by spraying, dipping, bar coating, roll coating, spin coating, or gel coating. The drying of the coated film may be carried out, for example, by a natural drying method in which the solvent is removed at room temperature for about 1 minute to about 1 hour, a forced drying method in which the drying is carried out for about 1 minute to about 30 minutes using nitrogen gas or air heated to about 100° C. from room temperature, a heat drying method using an infrared or far infrared ray furnace, or by a heat drying method using a hot air furnance in which the coated substrate is heated from room temperature to about 200° C. for about 1 second to about 30 minutes in an ultraviolet light furnace, etc.

The coated film can be cured by various methods, for example a method of curing by light, in which light is irradiated at room temperature to about 200° C. for about 0.1 second to about 5 hours, preferably for about 0.5 second to about 1 hour, in the air or in an inert gas atmosphere or in an air-shut off condition using a such a light source as a carbon arc lamp, a xenon lamp, a low-pressure mercury lamp, a high-pressure mercury lamp, an ultra high pressure mercury lamp or a metal halide lamp; a method of curing by heat in which the coated film is heated to about 200° C. from room temperature for about 0.1 second to about 20 hours, preferably for about 0.5 second to about 2 hours in air, in an inert gas atmosphere, or in an air-shut off condition; a method of curing by electron beams, in which electron beams are irradiated at room temperature to about 100° C. for about 0.1 second to about 30 minutes in the air or in an inert gas atmosphere; and a method of curing by ionizing radiation from $Co^{60}$, etc. A suitable method may be selected form these examples depending upon the type of the substrate and the types of the individual components of the coating composition of this invention.

The thickness of the cured coated film prepared from the uncured filled coating composition of this invention may be suitably selected; for example, it is about 0.1 micron to about 50 microns, preferably about 2 microns to about 20 microns.

The type of the substrate which is to be coated with the composition of this invention is not particularly limited, and various plastics, metals, ceramics and other materials can be conveniently used.

Specific examples of the plastics include polycarbonates (e.g., polybisphenol-A carbonate or polyallyl glycol carbonate), polyacrylate-type polymers (e.g., polymethyl acrylate or polymethyl methacrylate; including copolymers with ethyl acrylate, ethyl methacrylate or ethylene glycol dimethacrylate), polyesters (e.g., polyethylene terephthalate, polytetramethylene terephthalate, or a co-condensate of terephthalic acid, isophthalic acid and bisphenol-A), polyolefins (e.g., polyethylene, polypropylene, polybutene, poly-4-methyl-1-pentene, an ethylene/propylene copolymer, an ethylene/butene copolymer or an ethylene/4-methyl-1-pentene copolymer), an olefin polar group-containing olefin copolymer (e.g. an ethylene/vinyl acetate copolymer, an ethylene/ethyl acrylate copolymer, or an ethylene/(meth)acrylate copolymer), an ethylene/α-olefin/nonconjugated or conjugated diene terpolymer, an olefin-type graft copolymer (e.g., an ethylene/vinyl acetate/vinyl chloride graft copolymer or EPSAN resin), a chlorinated resin (e.g., chlorinated polyethylene or chlorinated polypropylene), vinyl chloride resins, vinylidene chloride resins, an ionomer resin (e.g., a metal salt of a partially hydrolyzed product of an ethylene/methyl methacrylate copolymer marketed under the tradename "Surlyn"), a fluorine-containing resin (e.g., polytetrafluoroethylene, tetrafluoroethylene copolymers), polyvinyl acetate, phenoxy resin, butadiene resin, unsaturated polyesters, nitrocellulose, acetyl cellulose, polystyrene, acrylonitrile/styrene copolymer, an acrylonitrile/butadiene/styrene copolymer, a methyl methacrylate/butadiene/styrene copolymer, polysulfone resin, polyphenylene oxides, modified polyphenylene oxide, polyphenylene sulfide resin, polyethersulfone resins, polyimides, polyamides, polyacetals, polyurethanes, melamine resins, phenolic resins, epoxy resins, guanamine resins, diallyl phthalate resins, vinylester resins, furan resins, urea resins, xylene resins, coumarone resins, ketone resins, vinyl propionate resins, polyethylene oxide, polyterpene resins, polyvinyl alcohol, polyvinyl ether, polyvinyl butyral resin, polyvinyl formal resin, maleic acid resin, and resorcinol resin. The coating composition of this invention may be applied to a mixture of two or more of these plastics. It can also be applied to fiber reinforced plastics obtained by reinforcing these plastics with glass fibers, carbon fibers, or the like, or reinforced plastics obtained by incorporating inorganic materials such as talc, calcium carbonate or silica in the aforesaid plastics.

Examples of the metal substrates are aluminum, iron, copper, zinc, tin, lead, nickel, chromium, titanium, and zirconium, or the alloys of these. Examples of the alloys are stainless steel, Duralmine, and brass.

Examples of the ceramics are glass, earthenware, porcelains, and alumina.

The composition of this invention may also be applied to leathers and urushi (i.e., Japanese lacquer).

Since the composition of this invention gives coated films having excellent transparency, excellent characteristics properties such as weatherability, adhesion to substrates and thermal durability, and excellent hardness, scratch resistance, abrasion resistance, chemical resistance and surface gloss, it is useful for forming a transparent coated layer on various substrates.

Transparent articles having a cured coating layer can be provided by applying the uncured filled coating composition of this invention to a transparent substrate, and then curing the composition on the substrate. For example, this can be achieved by using transparent materials such as glass, polycarbonate resins, acrylic resins and polystyrene as a substrate. Such articles may be used, for example, as covers of various appliances and instruments, windowpanes, panels, light-collecting panels, sky domes, panels of solar heaters, head or tail lamp covers of cars, glass covers of watches, various lenses in eyeglasses and cameras, contact lenses, and optical prisms. They can also be used as transparent parts of household electric appliances, automotive parts, automatic vendor parts, general industrial materials, construction and civil engineering materials, business and information machines and appliances, electronics component parts, packaging materials, sporting goods, medical instruments, and component parts related to nuclear power.

Products obtained by coating the composition of this invention on fibers of plastics or ceramics having a higher refractive index can be used as optical fiber elements.

The substrates may of course be non-transparent materials, and a transparent coated film can be formed on the substrates from the coating composition of this invention. For example, the coating composition of this invention may be applied to floor tiles, table tops, tableware, furniture, receptacles, bumpers, and non-transparent parts of household electrical appliances, automotive parts, automatic vendor parts, architectural and civil engineering materials, general industrial materials, business and information machines and appliances, electronics component parts, packaging materials, sporting goods, medical instruments, and parts related to nuclear power.

The following examples illustrate the present invention more specifically. The various properties given in these examples were measured by the following methods.

(1) Average first-order particle diameter (R)

The sample was photographed through a transmission-type electron microscope, and the diameters of about 3,000 to about 5,000 particles were measured. The arithmetic average of these diameters was calculated.

(2) Refractive index (n)

The sample, fully dried, was put to a concentration of 2% by weight in each of liquids having known refractive indices. The transparency of the dispersion was examined visually, and the refractive index of the liquid which looked most transparent was defined as the refractive index of the sample.

(3) Weatherability

The sample, 5×10 cm, was maintained for 300 hours in a Sunshine Weather-Ometer set at a rainfalling time of 20 minutes/60 minutes, a black panel temperature of 63° C. and a glass filter exchanging time of 200 hours. Then, the discoloration, creases, blisters, cracking, turbidity, peeling or gloss of the coating on the surface of the test sample were visually observed, and the haze, light transmittance and adhesion of the sample were measured.

(4) Hot water resistance

The test sample, 5×10 cm, was dipped for 30 days in hot water at 80° C. The dipped test sample was observed and measured in the same way as in the weatherability test described above.

(5) Heat cycle resistance

The test sample, 5×10 cm, was left to stand in a refrigerator chamber at −40° C. for 2 hours, then at room temperature for 1 hour, further in an air oven at 100° C. for 2 hours, and finally at room temperature for 1 hour. This cycle was repeated 10 times. The test sample was then observed and measured in the same way as in the weatherability test described above.

(6) Heat resistance

The test sample, 5×10 cm, was maintained in an air oven at 100° C. for 400 hours. Then, the test sample was observed and measured in the same way as in the weatherability test described above.

(7) Taber abrasion

Measured in accordance with ASTM D-1044.

(8) Impact strength

Measured at 23° C. by means of a Du Pont impact tester.

(9) Light transmittance

Measured in accordance with ASTM D-1003.

(10) Pencil hardness

Pencils of different hardnesses were used. The tip of the core of each pencil was made smooth and sharpened, and set at an angle of 45° with respect to a test sample. A load of 1 kg was exerted on the pencil, and the pencil core was allowed to move about 3 mm over the sample at a speed of about 0.5 mm/sec. The measurement was repeated five times at different positions every time a pencil of a different hardness was used. The hardness of that pencil which broke the coated film of the sample, or caused a scratch to the sample (when the sample was uncoated), by not more than two movements is defined as the pencil hardness of the sample.

(11) Martense hardness

The coated film of the sample was scratched by exerting a load of 10 g on the tip of a diamond spindle in a Martense scratch hardness testing apparatus (made by Tokyo Koki Co., Ltd.). Then, the width of the scratch was measured by a microscope, and the reciprocal of the measured width was defined as the Martense hardness. Hence, larger values show higher hardness.

(12) Abrasion resistance

In accordance with the method of ASTM D673, a silicon carbide abrasive material weighing 800 g was let fall onto the coated film of the sample. The difference of the haze of the sample before and after the testing was defined as the abrasion resistance. Smaller values show higher abrasion resistance. The haze was measured in accordance with ASTM D1003.

(13) Adhesion

By using a sharp blade, eleven straight cuts reaching the substrate were provided on the coated film of the sample both lengthwise and crosswise at intervals of 1 mm, thus providing 100 squares each measuring 1 mm$^2$ in area. A Cellophane adhesive (trade mark) tape was attached to the cut surface, and after sufficient adhesion, peeled off laterally. The number of squares which remained adhering to the substrate was counted, and shown against 100 squares.

(14) Flexural resistance (i.e., flexibility)

A rectangular test sample, 5 cm wide and 10 cm long, was prepared, and bent along the periphery of a cylindrical rod having a diameter of 2 cm. The angle of bending at which the coated film cracked or separated from the substrate was determined, and defined as the flexural resistance. Larger values show better flexibility.

(15) Surface glass

Measured in accordance with ASTM D523.

Various coating compositions used in the following examples were prepared by the following methods.

(1) Coating composition $A_1$

A mixer equipped with a powerful stirrer was charged with 150 g of diethylene glycol dimethacrylate (2a) having a molecular weight of 222 and containing dissolved therein 1.5 g of benzoyl peroxide, and 26 g of finely divided anhydrous silica having an R of about 20 m$\mu$ and an n of 1.45 (obtained by treating the surface of silica synthesized by the gaseous phase method, with $Cl_2Si(CH_3)_2$ to render its surface hydrophobic; R-972, a tradename for a product of Nippon Aerosil Co., Ltd.). While the mixer was cooled with tap water, the mixture was sufficiently stirred until the surface of the silica got wet with the monomer. The mixture was then transferred to an attriter (made by Mitsui-Miike Works, Ltd.) filled with alumina balls. While the attriter was cooled with tap water, the stirrer was rotated at a speed of 100 rpm to perform mixing for 2 hours. The mixture was withdrawn from the attriter. This mixture was an opalescent viscous liquid and designated as a coating composition $A_1$.

(2) Coating composition $A_2$

A coating composition $A_2$ was prepared in accordance with the same formulation as in the preparation of the coating composition $A_1$ except that 5 g of benzoin ethyl ether was used instead of 1.5 g of benzoyl peroxide, and 200 g of n-butanol was additionally supplied.

(3) Coating compositions $A_3$ to $A_7$

Coating compositions were prepared in accordance with the same formulation as in (1) above except that the finely divided silica was replaced by each of the following inorganic materials.

$A_3$: glass powder (R=about 300 m$\mu$, n=about 1.52), $A_4$: nacrite powder (R=about 400 m$\mu$, n=about 1.56), $A_5$: alumina powder (R=about 2 microns, n=about 1.77), $A_6$: finely divided alumina (Aluminum Oxide C, a product of Nippon Aerosil Co., Ltd.; R=about 20 m$\mu$ and n=about 1.76), $A_7$: amorphous silica (IMSIL, a product of Illinois Minerals; R=1.7 microns, n=about 1.55).

(4) Coating composition $B_1$

A 2-liter homogenizer was charged with 200 g of tri-ethylene glycol dimethacrylate (2b) having a molecular weight of 266, 322 g (96.6 g as solids) of methanol silica sol having an R of about 15 m$\mu$ and an n of 1.45 to 1.55 (a product of Nissan Chemical Co., Ltd.; prepared by dispersing fine particles of silica in water in colloidal form, adding methanol to the colloidal silica, and then removing water as an azeotrope with methanol; silica concentration 30% by weight), 68 g of n-butanol and 10 g of benzoin propyl ether. While the homogenizer receptacle was cooled with ice, these materials were mixed for 1 hour. The resulting coating composition ($B_1$) was an opalescent liquid.

(5) Coating composition $B_2$

Triethylene glycol dimethacrylate (2b) (200 g) and 180 cc of acetone were added to a 5,000 cc four-necked flask equipped with stirring impellers and a reflux condenser. With stirring, the inside of the flask was purged with nitrogen, and the temperature was raised until the acetone was refluxed. Under refluxing of acetone, 27 g of benzoyl peroxide dissolved in 100 cc of acetone was added over 1 minute using a dropping funnel, and the triethylene glycol dimethacrylate was polymerized for 10 minutes. The polymerization product was allowed to cool to room temperature to form a clear reaction mixture. The reaction mixture was precipitated with 10 liters of methanol. The precipitate was filtered, and the filtration cake was dried under reduced pressure for 24 hours to give 30 g of a prepolymer of the aforesaid monomer. By G.P.C., the prepolymer was found to have an average molecular weight of 76,000 and a molecular weight distribution of 2.5, and its melting point was 150° C.

Thirty grams of the prepolymer was dissolved at room temperature in a mixed solvent of 150 cc of acetone and 200 cc of methyl ethyl ketone containing 0.03 g of benzoylperoxide. The solution was transferred to a dissolver having a 500 cc mixing tank. Furthermore, 3 g of silica (Aerosil R 972, a product of Nippon Aerosil Co., Ltd.) was added, and while the mixing tank was cooled with ice, they were mixed for 1 hour to form a coating composition ($B_2$).

(6) Coating composition C

A coating composition C was prepared in the same way as in the production of the coating composition B₁ except that ethane diglycidyl ether diacrylate having a molecular weight of 318 (6a) was used instead of the tri-ethylene glycol dimethacrylate.

(7) Coating composition D

A coating composition D was prepared in the same way as in the preparation of the coating composition B₁ except that diethylene glycol diglycidyl ether dimethacrylate having a molecular weight of 390 (6b) was used instead of the tri-ethylene glycol dimethacrylate.

(8) Coating composition E₁

150 g of 1,6-hexanediol dimethacrylate (1e) having a molecular weight of 254 with 2 g of benzoin ethyl ether dissolved therein was put in a mortar having a mouth diameter of 26 cm, and 45 g of finely divided anhydrous silica (R-972 of Nippon Aerosil Co., Ltd.) was added. They were mixed fully until the mixture became flaky. The flaky mixture was then transferred to a two-roll mill, and 105 g of finely divided anhydrous silica having an R of about 20 mµ was added. They were mixed fully at room temperature until they became homogeneous. The resulting coating composition (E₁) was a viscous transparent gel-like material (the average particle diameter of the gel was about 150 mµ).

(9) Coating composition E₂

A coating composition E₂ was prepared by mixing 100 g of 1,6-hexanediol dimethacrylate (1e), 3 g of benzoin methyl ether, 100 g of methanol silica sol (a product of Nissan Chemical Co., Ltd.), 15 g of isopropyl alcohol and 15 g of toluene by means of an attriter.

(10) Coating composition E₃

Eight grams of benzoin isopropyl ether, 200 g of 1,6-hexanediol dimethacrylate (1e), 70 g of methanol silica sol (a product of Nissan Chemical Co., Ltd.), 30 g of finely divided silica (R-972, a product of Nippon Aerosil Co., Ltd.) and 130 g of isopropanol were mixed by an attriter in the same way as in the preparation of the coating composition A₁. The mixture was filtered through a 400-mesh stainless steel screen to form a coating composition (E₃).

(11) Coating composition E₄

A mixture was prepared by the same method as described in the preparation of the coating composition A₁ from 10 g of benzoin ethyl ether, 200 g of 1,6-hexanediol dimethacrylate (1e), 52 g of finely divided silica (R-972, a product of Nippon Aerosil Co., Ltd.) and 70 g of n-butanol. The mixture was put in a mixing tank equipped with a stirrer, and 200 g of n-butanol was additionally supplied. They were fully mixed, and filtered through a 400-mesh screen to give a coating composition (E₄).

(12) Coating composition F

A mixture was prepared by the method described in the preparation of the coating composition A₁ from 10 g of benzoin ethyl ether, 100 g of 1,6-hexanediol dimethacrylate (1e), 100 g of trimethylolpropane trimethacrylate (3C), 52 g of finely divided silica (R-972 of Nippon Aerosil) and 70 g of n-butanol. The mixture was put in a mixing tank equipped with a stirrer, and 140 g of n-butanol was further added. They were mixed fully. The mixture was withdrawn from the tank, and filtered through a 400-mesh screen to give a coating composition (F).

(13) Coating composition G

A coating composition G was prepared by the method described in the preparation of the coating composition A₁ from 6 g of benzoin ethyl ether, 60 g of 1,6-hexanediol diacrylate (1e), 140 g of trimethylolpropane triacrylate (3c) having a molecular weight of 296, 180 g of methanol silica sol (a product of Nissan Chemical Co., Ltd.) and 100 g of isopropanol by means of a dissolver.

(14) Coating composition H

A coating composition H was prepared in the same way as in the preparation of the coating composition A₁ except that 190 g of 1,6-hexanediol dimethacrylate (1e) and 10 g of 4-methacryloylethyl trimellitic anhydride were used as monomers, and OSCAP-3102 (silica having an R of 10 to 20 mµ and an n of 1.45 to 1.55 and prepared by removing water from colloidal silica as an azeotrope with alcohol and distilling off the alcohol further to form a powder; a product of Shokubai Kasei Co., Ltd.) was used instead of silica (R-97).

(15) Coating composition I

A coating composition I was prepared by mixing 150 g of trimethylolpropane trimethacrylate (3c) having dissolved therein 1.5 g of azobisisobutyronitrile, and 160 g of silica (Aerosil R-972) in the same way as in the preparation of the coating composition E₁.

EXAMPLE 1

A press-formed sheet (50×100×2 mm) of polymethyl methacrylate (PMMA for short) was subjected to plasma discharge treatment by means of a plasma issuer (LTA-2LD, a product of Yanagimotor Seisakusho) for 10 minutes at an O₂ flow rate of 20 cc/min. and a pressure of 1 mmHg. The coating composition A₁ was coated on the treated sheet by a bar coater, and its surface was covered with a biaxially stretched polyethylene terephthalate film in order to increase the smoothness of the surface of the coated film and to shut it off from the air. The coated film was then cured at 120° C. for 10 minutes in an atmosphere of nitrogen. The properties of the coated film are shown in Table 1.

EXAMPLE 2

The coating composition E₁ was coated on a PMMA sheet subjected to corona discharge treatment, and the thickness of the coated layer was adjusted by using a mirror surface-finished roll. Then, a biaxially stretched polyethylene terephthalate film was put on the coated layer, and a plate which had been mirror surface-finished was placed on it. The assembly was heated at 120° C. for 10 minutes to cure the coated layer.

EXAMPLES 3 AND 4

The procedure of Example 1 was repeated except that each of the coating compositions A₃ and A₄ was used instead of the coating composition A₁.

EXAMPLE 5

A PMMA sheet which had been subjected to corona discharge treatment was dipped slowly in the coating composition E₂. Ten seconds later, it was slowly withdrawn. The sheet was dried at 25° C. for 5 minutes, and light was irradiated from a high pressure mercury arc lamp onto the dried sheet in an atmosphere of nitrogen for 10 minutes to photocure the coated layer.

COMPARATIVE EXAMPLE 1

The properties of the PMMA sheet not subjected to any coating treatment are shown in Table 1.

COMPARATIVE EXAMPLE 2

The procedure of Example 1 was repeated except that the silica was not incorporated in the coating composition $A_1$.

COMPARATIVE EXAMPLES 3 TO 5

The procedure of Example 1 was repeated except that each of the coating compositions $A_5$, $A_6$ and $A_7$ was used. The coated films obtained in these Comparative Examples were non-transparent and had much inferior weatherability, hot water resistance, boiling water resistance and heat cycle resistance than the coated film obtained in Example 1.

TABLE 1

| Properties | Example 1 | Example 2 | Example 3 | Example 4 | Example 5 |
|---|---|---|---|---|---|
| Coating composition | A | E | $A_3$ | $A_4$ | $E_2$ |
| Thickness of the coated layer (μ) | 10 | 15 | 10 | 10 | 4 |
| Pencil hardness | 8H | >9H | 8H | 7H | 8H |
| Martense hardness (l/mm) | 80 | 100 | 80 | 80 | 100 |
| Adhesion | 100/100 | 100/100 | 100/100 | 100/100 | 100/100 |
| Light transmittance (%) | 93 | 94 | 93 | 92 | 92.5 |
| Haze (%) | 1.5 | 1.5 | 1.5 | 1.5 | 1.5 |
| Abrasion resistance (Δ% haze) | 5 | 5 | 7 | 10 | 5 |
| Tabes abrasion (Δ% haze) | 5 | 8 | 8 | 10 | 10 |
| Flexural resistance (°) | 120 | 80 | 120 | 120 | 80 |
| Du Pont impact strength | | | | | 40 |
| Weatherability | | | | | |
| Appearance | No change | No change | No change | No change | No change |
| Adhesion | 100/100 | 100/100 | 100/100 | 100/100 | 100/100 |
| Light transmittance | 92 | 93.5 | 92 | 91 | 92 |
| Haze | 5 | 4.5 | 5 | 5 | 5 |
| Hot water resistance | | | | | |
| Appearance | No change | No change | No change | No change | No change |
| Adhesion | 100/100 | 100/100 | 100/100 | 100/100 | 100/100 |
| Light transmittance | 93 | 94 | 93 | 92 | 92 |
| Haze | 6 | 7 | 6 | 7 | 6 |
| Boiling water resistance | | | | | |
| Appearance | No change | No change | No change | No change | No change |
| Adhesion | 100/100 | 100/100 | 100/100 | 100/100 | 100/100 |
| Light transmittance | 92.5 | 93 | 92.5 | 91 | 91.5 |
| Haze | 7 | 8 | 7 | 7 | 8 |
| Heat cycle resistance | | | | | |
| Appearance | No change | No change | No change | No change | No change |
| Adhesion | 100/100 | 100/100 | 100/100 | 100/100 | 100/100 |
| Light transmittance | 92.5 | 93 | 92.5 | 92 | 92 |
| Haze | 2 | 2 | 2 | 2 | 2 |
| Heat resistance | | | | | |
| Appearance | No change | No change | No change | No change | No change |
| Adhesion | 100/100 | 100/100 | 100/100 | 100/100 | 100/100 |
| Light transmittance | 92 | 93 | 92 | 91.5 | 92 |
| Haze | 2 | 2 | 2 | 2 | 2 |

| Properties | Comparative Example 1 | Comparative Example 2 | Comparative Example 3 | Comparative Example 4 | Comparative Example 5 |
|---|---|---|---|---|---|
| Coating composition | — | \<A\> | $A_5$ | $A_6$ | $A_7$ |
| Thickness of the coated layer (μ) | — | 10 | 10 | 10 | 10 |
| Pencil hardness | 2H | 4H | 6H | 8H | 4H |
| Martense hardness (l/mm) | 20 | 40 | 50 | 80 | 50 |
| Adhesion | — | 100/100 | 95/100 | 100/100 | 100/100 |
| Light transmittance (%) | 92.5 | 93 | <30 | <30 | <30 |
| Haze (%) | 1.5 | 2 | >60 | >60 | >60 |
| Abrasion resistance (Δ% haze) | 60 | 30 | — | — | — |
| Tabes abrasion (Δ% haze) | 40 | 30 | — | — | — |
| Flexural resistance (°) | — | 120 | 45 | 110 | 30 |
| Du Pont impact strength | 40 | | | | |
| Weatherability | | | | | |
| Appearance | Turbidity occurred | Turbidity occurred | Cracking occurred | No change | Cracking occurred |
| Adhesion | — | 100/100 | 85/100 | 100/100 | 90/100 |
| Light transmittance | 88.5 | 89 | <30 | <30 | <30 |
| Haze | 13 | 19 | >60 | >60 | >60 |
| Hot water resistance | | | | | |
| Appearance | Turbidity occurred | Turbidity occurred | Cracking occurred | No change | Cracking occurred |
| Adhesion | — | 95/100 | 80/100 | 100/100 | 75/100 |
| Light transmittance | 88 | 89.5 | <30 | <30 | <30 |
| Haze | 29 | 28 | >60 | >60 | >60 |
| Boiling water resistance | | | | | |
| Appearance | Turbidity occurred | Turbidity occurred | Cracking occurred | No change | Cracking occurred |
| Adhesion | — | 90/100 | 70/100 | 100/100 | 50/100 |

TABLE 1-continued

| | | | | | |
|---|---|---|---|---|---|
| Light transmittance | 86 | 86 | <30 | <30 | <30 |
| Haze | 32.5 | 31 | >60 | >60 | >60 |
| Heat cycle resistance | | | | | |
| Appearance | No change | Cracking occurred | Cracking occurred | No change | Cracking occurred |
| Adhesion | — | 89/100 | 90/100 | 100/100 | 80/100 |
| Light transmittance | 92 | 88 | <30 | <30 | <30 |
| Haze | 5 | 14.5 | >60 | >60 | >60 |
| Heat resistance | | | | | |
| Appearance | No change | No change | Cracking occurred | No change | Cracking occurred |
| Adhesion | — | 100/100 | 90/100 | 100/100 | 85/100 |
| Light transmittance | 92 | 91 | <30 | <30 | <30 |
| Haze | 3 | 3 | >60 | >60 | >60 |

EXAMPLE 6

A commercial polycarbonate sheet having a thickness of 2 mm (SUNLIDE POLYCACE, a tradename for a product of Tsutsunaka Plastics Co., Ltd.) was subjected to corona discharge treatment by means of a corona discharging apparatus (a product of Tomoe Industries, Co., Ltd.) at a voltage of 200 V and a take-up speed of 7 mm/min. The sheet was then dipped for 15 seconds in the coating composition $A_2$, and then dried at room temperature for 5 minutes. Then, in an atmosphere of nitrogen, light was irradiated onto the dried sheet from an ultrahigh-pressure mercury lamp for 15 minutes. The properties of the resulting coated film are shown in Table 2.

EXAMPLE 7

A commercial polycarbonate sheet having a thickness of 3 mm, of which surface had been cleaned, was coated with the coating composition F by means of a bar coater. The coated sheet was dried at 30° C. for 10 minutes and then in an atmosphere of nitrogen, ultraviolet light was irradiated onto it from a high-pressure mercury lamp for 10 minutes to cure the coated layer.

EXAMPLE 8

A commercial polycarbonate sheet having a thickness of 3 mm, of which surface had been cleaned, was coated with the coating composition G by means of a bar coater. The coated sheet was dried at 40° C. for 5 minutes, and in an air atmosphere, light was irradiated onto the dried sheet from a high-pressure mercury lamp for 1.5 minutes to cure the coated layer.

COMPARATIVE EXAMPLE 6

The properties of the polycarbonate sheet before subjecting to the coating treatment, are shown in Table 2.

COMPARATIVE EXAMPLE 7

The properties of a commercial surface-cured polycarbonate sheet (MARGARD, a tradename for a product of General Electric Company) are shown in Table 2.

TABLE 2

| | Example | | | Comparative Example | |
|---|---|---|---|---|---|
| Properties | 6 | 7 | 8 | 6 | 7 |
| Coating composition | $A_2$ | F | G | — | — |
| Thickness of the coated layer (μ) | 5 | 5 | 5 | — | 5 |
| Pencil hardness | 2H | 2H | 2H | HB | 2H |
| Martense hardness (l/mm) | 100 | 90 | 100 | 40 | 100 |
| Adhesion | 100/100 | 100/100 | 100/100 | — | 100/100 |
| Light transmittance (%) | 91 | 91 | 91 | 89.5 | 92 |
| Haze (%) | 2 | 2 | 2 | 2 | 1 |
| Abrasion resistance (Δ% haze) | 6 | 4~7 | 9 | 60 | 5~10 |
| Tabes abrasion (Δ% haze) | 2 | 4 | 3 | 30 | 4 |
| Flexural resistance (°) | >180 | 60 | 80 | — | 45 |
| Weatherability | | | | | |
| Appearance | No change | No change | No change | Turbidity occurred | Turbidity occurred |
| Adhesion | 100/100 | 100/100 | 100/100 | — | 100/100 |
| Light transmittance | 89.5 | 89 | 89.5 | 85.5 | 88 |
| Haze | 7 | 6 | 7 | 13 | 14 |
| Hot water resistance | | | | | |
| Appearance | No change | No change | No change | Turbidity occurred | Turbidity occurred |
| Adhesion | 100/100 | 100/100 | 100/100 | — | 0/100 |
| Light transmittance | 89 | 88 | 88 | 84 | 86 |
| Haze | 9 | 10 | 9.5 | 14 | 11 |
| Boiling water resistance | | | | | |
| Appearance | No change | No change | No change | Turbidity occurred | Turbidity and cracking occurred |
| Adhesion | 100/100 | 100/100 | 100/100 | — | 0/100 |
| Light transmittance | 85 | 87 | 84.5 | 70 | 60 |
| Haze | 13 | 12 | 13.5 | 25 | 30 |
| Heat cycle resistance | | | | | |
| Appearance | No change | No change | No change | No change | No change |
| Adhesion | 100/100 | 100/100 | 100/100 | — | 100/100 |

TABLE 2-continued

| Properties | Example | | | Comparative Example | |
|---|---|---|---|---|---|
| | 6 | 7 | 8 | 6 | 7 |
| Light transmittance | 90.5 | 90 | | 88.5 | 91.5 |
| Haze | 3 | 3 | 4 | 2 | 2 |
| Heat resistance | | | | | |
| Appearance | No change | No change | No change | No change | No change |
| Adhesion | 100/100 | 100/100 | 100/100 | — | 100/100 |
| Light transmittance | 90.5 | 90.5 | 90 | 88 | 91 |
| Haze | 2.5 | 2.5 | 2.5 | 2.5 | 1.5 |

EXAMPLE 9 AND COMPARATIVE EXAMPLES 6 AND 7

A commercial polycarbonate sheet was coated with a primer in the same way as in Example 10 to be described, and the coating composition D was coated on the primer layer by means of a bar coater. The coated sheet was dried at room temperature for 5 minutes. In an atmosphere of nitrogen, light was irradiated onto the dried sheet from an ultrahigh-pressure mercury lamp for 10 minutes. The polycarbonate sheet was then dipped at room temperature in each of the solvents shown in Table 3 for 24 hours, and then the state of the polycarbonate sheet was visually observed. The results are shown in Table 3. The properties of a commercial surface-untreated polycarbonate sheet (Comparative Example 6) and a surface-cured polycarbonate sheet (MARGARD, a product of General Electric Company) (Comparative Example 7) are also shown in Table 3.

TABLE 3

| Solvent | Example 9 | Comparative Example 6 | Comparative Example 7 |
|---|---|---|---|
| Toluene | No change both in the coated film and the substrate | Whitened in 30 minutes, and partly dissolved. | The substrate became whitely cloudy, and the coated film was partly peeled. |
| Ethyl acetate | No change both in the coated film and the substrate | Whitened in 30 minutes, and partly dissolved. | The substrate became whitely cloudy, and the coated film was partly peeled. |
| Methyl ethyl ketone | No change both in the coated film and the substrate | Whitened in 10 minutes, and almost completely dissolved. | The substrate became whitely cloudy, and the coated film was partly peeled. |
| $CCl_4$ | No change both in the coated film and the substrate | The surface layer dissolved. | The substrate became whitely cloudy, and the coated film was partly peeled. |
| Ethanol | No change | No change | No change |
| 10% NaOH aq. solution | The coated film partly rose. | Whitened | The coated film partly rose. |
| 10% $H_2SO_4$ aq. solution | No change | No change | No change |
| 10% NaCl aq. solution | No change | No change | No change |

EXAMPLE 10

An injection-molded sheet of poly-4-methyl-1-pentene (MX004, a tradename for a product of Mitsui Petrochemical Industries, Ltd.), 60×120×2 mm, was dipped for 10 seconds in a 1,1,1-trichloroehtane solution of maleic anhydride-modified ethylene-propylene rubber (ethylene content about 60 mole%; maleic acid anhydride content 7.7% by weight, $[\phi]=2.2$) in a concentration of 15 g/liter to form a primer thereon. The sheet was then left to stand at room temperature for 5 minutes, and coated with the coating composition $E_4$ by means of a bar coater. The coated sheet was dried at room temperature for 5 minutes, and then in an atmosphere of nitrogen, light was irradiated thereon from an ultrahigh-pressure mercury lamp for 10 minutes to cure the coated layer. The properties of the coated layer are shown in Table 4.

EXAMPLE 11

A sheet of poly-4-methyl-1-pentene (MX-004) which had been subjected to primer treatment in the same way as in Example 10 was dipped for 20 seconds in the coating composition $B_2$, and then air-dried at room temperature for 2 minutes. The sheet was then heated at 100° C. for 15 minutes to form a cured coated layer having a thickness of 10 microns.

COMPARATIVE EXAMPLE 8

The properties of the uncoated poly(4-methyl-1-pentene) sheet are shown in Table 4.

COMPARATIVE EXAMPLE 9

A poly(4-methyl-1-pentene) sheet was dipped for 5 seconds in a 1,1,1-trichloroethane solution of vinyltriethoxysilane-modified ethylene-propylene rubber (ethylene content about 60 mole%; vinyltriethoxysilane content 17.5% by weight; $[\phi]=2.5$) in a concentration of 15 g/liter for to form a primer thereon. The sheet was dried at room temperature for 5 minutes, and dipped for 10 seconds in a surface curing coating agent of the vinyltrimethoxysilane oligomer-type (X-12-917, a tradename for a product of Shinetsu Chemical Co., Ltd.), left to stand indoors for 5 minutes, and then baked at 80° C. for 1 hour.

TABLE 4

| Properties | Example 10 | Example 11 | Comparative Example 8 | Comparative Example 9 |
|---|---|---|---|---|
| Coating composition | C | $B_2$ | — | — |
| Thickness of the coated layer ($\mu$) | 5 | 10 | — | 5 |
| Pencil hardness | H | 2H | 3B | F |
| Martense hardness (l/mm) | 100 | 80 | 30 | 70 |
| Adhesion | 100/100 | 100/100 | — | 100/100 |
| Light transmittance (%) | 94 | 94 | 92 | 93.5 |
| Haze (%) | 2 | 2 | 2 | 2 |
| Abrasion resistance (Δ% haze) | 6 | 10 | 70 | 5 |
| Tabes abrasion (Δ% haze) | 4 | 6 | 50 | 10 |
| Flexural resistance (°) | 150 | >180 | — | <15 |
| Weatherability | | | | |
| Appearance | No change | No change | Cracking occurred | Cracking and turbidity occurred |
| Adhesion | 100/100 | 100/100 | — | 50/100 |
| Light transmittance | 93 | 93 | 89 | 82 |
| Haze | 6 | 7 | 30 | 35 |
| Hot water resistance | | | | |
| Appearance | No change | No change | Turbidity occurred | Turbidity and cracking occurred |
| Adhesion | 100/100 | 100/100 | — | 95/100 |
| Light transmittance | 92.5 | 93 | 88.5 | 88 |
| Haze | 9 | 9.5 | 28 | 19 |
| Boiling water resistance | | | | |
| Appearance | No change | No change | Turbidity occurred | Turbidity and cracking occurred |
| Adhesion | 100/100 | 100/100 | — | 90/100 |
| Light transmittance | 91.5 | 92 | 86.5 | 86.5 |
| Haze | 11 | 12 | 31 | 23 |
| Heat cycle resistance | | | | |
| Appearance | No change | No change | No change | Cracking occurred |
| Adhesion | 100/100 | 100/100 | — | 98/100 |
| Light transmittance | 93 | 93 | 91 | 91.5 |
| Haze | 2.5 | 2.5 | 3 | 16 |
| Heat resistance | | | | |
| Appearance | No change | No change | No change | Cracking occurred |
| Adhesion | 100/100 | 100/100 | — | 95/100 |
| Light transmittance | 93.5 | 93 | 91.5 | 87.5 |
| Haze | 2 | 2.5 | 2.5 | 1.9 |

EXAMPLE 12 AND COMPARATIVE EXAMPLE 10

A commercial biaxially stretched polyethylene terephthalate film (Lumilar, a tradename for a product of Toray Inc.) was subjected to corona discharge treatment in the same way as in Example 4. The coating composition $B_1$ was coated on the treated film by means of an applicator. The coated film was dried at 40° C. for 10 minutes, and then light was irradiated onto the dried film for 16 minutes from an ultrahigh-pressure mercury lamp in an atmosphere of nitrogen to form a coated film having a coating thickness of 8 microns. The properties of the coated film are shown in Table 5.

For comparison, the properties of the above biaxially stretched polyethylene terephthalate film bebore the coating treatment are also shown in Table 5 (Comparative Example 10).

TABLE 5

| Properties | Example 12 | Comparative Example 10 |
|---|---|---|
| Pencil hardness | 4H | 2H |
| Martense hardness (l/mm) | 100 | 40 |
| Adhesion | 100/100 | — |
| Light transmittance (%) | 88 | 86 |
| Haze (%) | 1.5 | 2 |
| Abrasion resistance (Δ% haze) | 10 | 60 |
| Taber abrasion (Δ% haze) | 10 | 40 |
| Flexural resistance (°) | 120 | — |

EXAMPLE 13 AND COMPARATIVE EXAMPLE 11

A polystyrene sheet (a product of Mitsubishi Resin Co., Ltd.) was coated with the coating composition $E_3$ by means of a bar coater, and dried at 20° C. for 10 minutes. In an atmosphere of nitrogen, light was irradiated on the dried sheet from a xenon lamp for 10 minutes. The properties of the surface-cured polystyrene sheet (Example 13) are shown in Table 6 in comparison with those of the untreated polystyrene sheet (Comparative Example 11).

TABLE 6

| Properties | Example 13 | Comparative Example 11 |
|---|---|---|
| Pencil hardness | 2H | F |
| Martense hardness (l/mm) | 80 | 30 |
| Adhesion | 100/100 | — |
| Light transmittance (%) | 92 | 90.5 |

TABLE 6-continued

| Properties | Example 13 | Comparative Example 11 |
|---|---|---|
| Haze (%) | 2 | 2.5 |
| Abrasion resistance (Δ% haze) | 15 | 75 |
| Taber abrasion (Δ% haze) | 18 | 80 |
| Flexural resistance (°) | 60 | — |

EXAMPLE 14 AND COMPARATIVE EXAMPLE 14

A commercial windowpane was subjected to the same plasma discharge treatment as in Example 1. The coating composition I was uniformly placed on the treated windowpane, and its surface was covered with a Lumilar film. The assembly was heat-pressed and cured by means of a press former at 110° C. and 150 kg/cm² for 10 minutes. The coated film had a coating thickness of 15 microns. The properties of the coated film are shown in Table 7.

For comparison, the properties of the windowpane not subjected to the coating treatment (Comparative Example 12) are also shown in Table 7.

TABLE 7

| Properties | Example 14 | Comparative Example 12 |
|---|---|---|
| Pencil hardness | >9H | >9H |
| Martense hardness (1/mm) | 150 | 100 |
| Abrasion resistance (Δ% haze) | 10 | 22 |
| Taber abrasion (Δ% haze) | 4 | 4 |
| Haze (%) | 2 | 1.5 |
| Adhesion | 100/100 | — |
| Light transmittance (%) | 91 | 90 |

EXAMPLE 15 AND COMPARATIVE EXAMPLE 13

An aluminum plate was dipped for 10 minutes in a mixture at 80° of 10 parts of phosphoric acid, 40 parts of n-butanol, 30 parts of isopropanol and 20 parts of water, all by volume. It was then withdrawn, washed with water, air-dried, and stored in a desiccator. The treated aluminum plate was dipped for 20 seconds in the coating composition H which had been defoamed by sonication. The aluminum plate was then slowly withdrawn, and dried at 40° C. for 3 minutes. Then, ultraviolet light was irradiated onto the dried plate from a low-pressure mercury lamp for 4 minutes to form a cure coated layer having a thickness of 5 microns. The properties of the surface-cured aluminum plate (Example 15) are shown in Table 8 in comparison with those of the non-treated aluminum plate (Comparative Example 13).

TABLE 8

| Properties | Example 15 | Comparative Example 13 |
|---|---|---|
| Adhesion | 100/100 | — |
| Pencil hardness | 2H | HB |
| Martense hardness (1/mm) | 100 | 40 |
| Abrasion resistance* | Hardly scratched | Markedly scratched |
| Taber abrasion | Hardly scratched | Markedly scratched |
| Flexural resistance | 90 | — |
| Surface gloss | 80 | 40 |

*Visually evaluated

EXAMPLE 16 AND COMPARATIVE EXAMPLE 14

A plate-like cured molded article prepared from an epoxy resin and glass balloon (whose surface had been cleaned) was subjected to the same primer treatment as in Example 10. The plate was then dipped for 20 seconds in the coating composition H and slowly withdrawn. The plate was then subjected to the same curing treatment as described in Example 15 to form a cured coated layer having a thickness of 10 microns (Example 16). The properties of the product are shown in Table 9 in comparison with those of the non-surface treated plate (Comparative Example 14).

TABLE 9

| Properties | Example 16 | Comparative Example 14 |
|---|---|---|
| Adhesion | 100/100 | — |
| Abrasion resistance* | Hardly scratched | Markedly scratched |
| Taber abrasion | Hardly scratched | Markedly scratched |
| Martense hardness (1/mm) | 90 | 30 |

*Evaluated by visual observation

EXAMPLE 17 AND COMPARATIVE EXAMPLE 15

A 2 mm-thick sheet of polypropylene obtained by injection molding was cleaned with a vapor of 1,1,1-trichloroethane for 2 minutes. Then, it was dipped for 10 seconds in a 15 g/liter toluene solution of an ethylene-propylene rubber modified with maleic anhydride (ethylene content 40 mole%; maleic anhydride content 6% by weight) to form a primer layer. The sheet was then heated at 100° C. for 30 minutes, and dipped for 20 seconds in the coating composition E4. The dipped sheet was dried at room temperature for 12 minutes and in an atmosphere of nitrogen for 5 minutes. Light was irradiated onto the dried sheet for 15 minutes form a high-pressure mercury lamp in an atmosphere of nitrogen to form a cured coated layer having a thickness of 7.5 microns. The properties of the coated sheet are shown in Table 10 in comparison with those of the non-coated polypropylene sheet.

TABLE 10

| Properties | Example 17 | Comparative Example 15 |
|---|---|---|
| Adhesion | 100/100 | — |
| Martense hardness (1/mm) | 80 | 20 |
| Abrasion resistance | Hardly scratched | Markedly scratched |
| Taber abrasion* (mg) | 0 | 6 |
| Surface gloss (%) | 85 | 35 |
| Flexural strength (°) | 90 | — |

*The weight loss of the test sample when an abrasion wheel CS-10 was rotated through 1000 revolutions.

What is claimed is:

1. In an uncured filled coating composition comprising (a) a polyfunctional acrylic carboxylic acid ester monomer or its prepolymer, (b) a polymerization initiator capable of curing said monomer or prepolymer (a), and (c) an inorganic solid filler; the improvement wherein said composition consists essentially of (A) 100 parts by weight of said polyfunctional acrylic carboxylic acid ester monomer or its prepolymer (a), said polyfunctional monomer or prepolymer (a) consisting essentially of a difunctional acrylic carboxylic acid ester monomer or its prepolymer having a molecular weight of about 160 to about 400, and 0 to 20 parts by weight, per 100 parts by weight of said monomer or prepolymer, of a monofunctional monomer copolymerizable with said monomer or prepolymer, (B) 0.001 to 20 parts by weight of said polymerization initiator (b) capable of curing said monomer or prepolymer (A), and (C) 5 to 250 parts by weight of said inorganic solid filler (c), said filler (c) having a refractive index of 1.40 to 1.60 and an average first-order particle diameter of at least 1 m$\mu$ but less than 1$\mu$.

2. The composition of claim 1 wherein the prepolymar is a polymerization product of said monomer consisting of 2 to 250 monomer molecules.

3. The composition of claim 1 wherein said polymerization initiator (B) is selected from the group consisting of radical polymerization initiators, photosensitizers and ionic polymerization initiators.

4. The composition of claim 1 wherein the inorganic solid filler (C) has a refractive index of 1.42 to 1.58 and an average first-order particle diameter of 1 m$\mu$ to 500 m$\mu$.

5. A cured filled coating composition prepared by curing the uncured filled coating composition of claim 1.

6. The composition of claim 1 wherein said polyfunctional acrylic carboxylic acid ester monomer or its prepolymer is diethylene glycol dimethacrylate and said inorganic solid filler is selected from the group consisting of anhydrous silica having an average first-order particle diameter of about 20 m$\mu$ and a refractive index of about 1.45, glass powder having an average first-order particle diameter of about 300 m$\mu$ and a refractive index of about 1.52 and nacrite powder having an average first-order particle diameter of about 400 m$\mu$ and a refractive index of about 1.56.

7. The composition of claim 1 wherein said polyfunctional acrylic carboxylic acid ester monomer or prepolymer is triethylene glycol dimethacrylate, ethane diglycidyl ether diacrylate or diethylene glycol diglycidyl ether dimethylacrylate, and the inorganic solid filler is a silica having an average first-order particle diameter of from about 15 to 20 m$\mu$ and a refractive index of from about 1.45 to 1.55.

8. In an uncured filled coating composition comprising (a) a polyfunctional acrylic carboxylic acid ester monomer or its prepolymer, (b) a polymerization initiator capable of curing said monomer or prepolymer (a), and (c) an inorganic solid filler; the improvement wherein said composition consists essentially of (A) 100 parts by weight of said polyfunctional acrylic carboxylic acid ester monomer or its prepolymer (a), said polyfunctional monomer or prepolymer (a) being selected from the group consisting of compounds of the following formula:

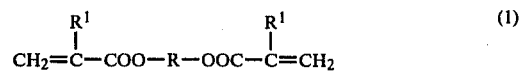

wherein R represents an alkylene group having 1 to 15 carbon atoms and $R^1$ represents a hydrogen atom or a methyl group;

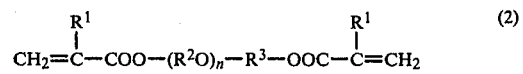

wherein $R^1$ represents a hydrogen atom or a methyl group, $R^2$ and $R^3$ each, independently, represent an alkylene group having 2 to 6 carbon atoms, and n is a number of at least 0.5;

(3) $(CH_2=C\text{-}COOCH_2)_{4-m}CR^4{}_m$ wherein $R^1$ represents hydrogen or methyl, $R^4$ represents an alkyl group having 1 to 15 carbon atoms or $CH_2OH$ and m is 0 or 1;

(4) diesters of acrylic or methacrylic acid and glycerol;

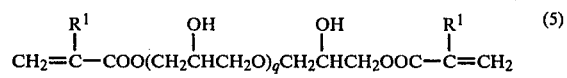

wherein $R^1$ represents hydrogen or methyl and q is 0 or an integer of 1 to 3; and

wherein $R^1$ represents hydrogen or methyl and $R^5$ represents an alkylene group having 2 to 5 carbon atoms, and 0 to 25 parts by weight per 100 parts by weight of said monomer or prepolymer, of a monofunctional monomer copolymerizable with said monomer or prepolymer, (B) 0.001 to 20 parts by weight of said polymerization initiator (b) capable of curing said monomer or prepolymer (A), and (C) 5 to 250 parts by weight of said inorganic solid filler (c), said filler (c) having a refractive index of 1.40 to 1.60 and an average first-order particle diameter of at least 1 m$\mu$ but less than 1$\mu$.

9. The composition of claim 8 wherein the polyfunctional acrylic carboxylic acid ester monomer is at least one compound selected from the group consisting of
$CH_2=CR^1\text{-}COO\text{-}CH_2CH_2\text{-}OOC\text{-}R^1C=CH_2$
$CH_2=CR^1\text{-}COO\text{-}CH(CH_3)CH_2CH_2\text{-}OOC\text{-}R^1C=CH_2$
$CH_2=CR^1\text{-}COO\text{-}(CH_2)_4\text{-}OOC\text{-}R^1C=CH_2$
$CH_2=CR^1\text{-}COO\text{-}CH_2C(CH_3)_2CH_2\text{-}OOC\text{-}R^1C=CH_2$
$CH_2=CR^1\text{-}COO\text{-}(CH_2)_6\text{-}OOC\text{-}R^1C=CH_2$
$CH_2=CR^1\text{-}COO\text{-}(CH_2CH_2O)_2\text{-}OC\text{-}R^1C=CH_2$
$CH_2=CR^1\text{-}COO\text{-}(CH_2CH_2O)_3\text{-}OC\text{-}R^1C=CH_2$
$CH_2=CR^1\text{-}COO\text{-}(CH_2CH_2O)_4\text{-}OC\text{-}R^1C=CH_2$
$CH_2=CR^1\text{-}COO\text{-}(CH(CH_3)CH_2O)_2\text{-}OC\text{-}R^1C=CH_2$
$(CH_2=CR^1\text{-}COOCH_2)_4C$
$(CH_2=CR^1\text{-}COOCH_2)_3C\text{-}CH_3$
$(CH_2=CR^1\text{-}COOCH_2)_3C\text{-}CH_2CH_3$
$(CH_2=CR^1\text{-}COOCH_2)_3C\text{-}CH_2OH$
$CH_2=CR^1\text{-}COOCH_2\text{-}CH(OH)\text{-}CH_2OOC\text{-}R^1C=CH_2$

HOCH$_2$-CH(OOC-R$^1$C=CH$_2$)-CH$_2$(OOC-R$^1$C=CH$_2$)

CH$_2$=CR$_1$-COO-CH$_2$CH(OH)CH$_2$O-C$_2$H$_4$O-CH$_2$CH(OH)CH$_2$-OOC-R$^1$C=CH$_2$

CH$_2$=CR$_1$-COO-CH$_2$CH(OH)CH$_1$O-(C$_2$H$_4$O)$_2$-CH$_2$CH(OH)CH$_2$-OOC-R$^1$C=CH$_2$, and

CH$_2$=CR$^1$-COO-(CH$_2$CH(OH)CH$_2$O)$_3$-OC-R$^1$C=CH$_2$.

10. The composition of claim 1 or 8 which consists essentially of (A) 100 parts by weight of said polyfunctional acrylic carboxylic acid ester monomer or its prepolymer; (B) 0.005 to 10 parts by weight of said polymerization initiator; and (C) 5 to 150 parts by weight of said inorganic solid filler.

11. The composition of claim 10 wherein the inorganic solid filler has a refractive index of 1.42 to 1.58 and an average first-order particle diameter of 1 m$\mu$ to 500 m$\mu$.

* * * * *